United States Patent [19]
Casey et al.

[11] Patent Number: 6,097,499
[45] Date of Patent: *Aug. 1, 2000

[54] METHODS AND APPARATUS FOR ISOCHRONOUS PRINTING WITH MINIMAL BUFFERING

[75] Inventors: Patrick Alan Casey, Frankfort; Shaun Timothy Love, Lexington; Timothy John Rademacher, Lexington; Steven Frank Weed, Lexington; Charles Thomas Wolfe, Lexington, all of Ky.

[73] Assignee: Lexmark International, Inc., Lexington, Ky.

[ * ] Notice: This patent issued on a continued prosecution application filed under 37 CFR 1.53(d), and is subject to the twenty year patent term provisions of 35 U.S.C. 154(a)(2).

[21] Appl. No.: 08/970,368

[22] Filed: Nov. 14, 1997

[51] Int. Cl.[7] .............................. B41B 15/00; B41J 15/00; G06F 15/00
[52] U.S. Cl. ............................................................ 358/1.16
[58] Field of Search .......... 395/114–116; 358/1.15–1.17

[56] References Cited

U.S. PATENT DOCUMENTS

| | | | |
|---|---|---|---|
| 4,203,679 | 5/1980 | Duerr et al. | 400/320 |
| 5,274,461 | 12/1993 | Mitsuhashi | 358/296 |
| 5,307,458 | 4/1994 | Freiburg et al. | 345/162 |
| 5,317,603 | 5/1994 | Osterweil | 375/122 |
| 5,382,968 | 1/1995 | Endoh | 347/112 |
| 5,473,735 | 12/1995 | Murakami | 395/116 |
| 5,490,237 | 2/1996 | Zimmerman et al. | 395/115 |
| 5,606,562 | 2/1997 | Landguth | 370/506 |
| 5,627,653 | 5/1997 | Nakazato | 358/300 |
| 5,671,445 | 9/1997 | Gluyas et al. | 710/53 |
| 5,675,139 | 10/1997 | Fama | 235/472.01 |
| 5,764,869 | 6/1998 | Bagley et al. | 395/115 |
| 5,816,714 | 10/1998 | Hori | 400/61 |
| 5,825,993 | 10/1998 | Shimura et al. | 395/115 |
| 5,845,152 | 12/1998 | Anderson et al. | 710/52 |
| 5,867,633 | 2/1999 | Taylor et al. | 395/109 |
| 5,887,989 | 3/1999 | Hannah | 400/61 |
| 5,915,127 | 6/1999 | Ogawa et al. | 395/878 |

OTHER PUBLICATIONS

Downing et al, Dictionary of Computer and Internet Terms, 6th Ed, Barron's, p 260, 1998.
Hoffman et al, IEEE 1394: A Ubiquitous Bus, http://www.skipstone.com, pp 1–9, 1995.

*Primary Examiner*—Joseph Mancuso
*Assistant Examiner*—F. E. Cooperrider
*Attorney, Agent, or Firm*—Frederick H. Gribbell; D. Brent Lambert

[57] ABSTRACT

Methods and apparatus for using isochronous data transfer mode to communicate between a host computer and a printer. Preferably, the printer receives a sufficient volume of data from the host, such as a computer, over an isochronous communications channel, to begin but not complete one print pass (i.e., line scan or page scan). Subsequently, the print pass is initiated causing a print mechanism to move a printing device relative to a substrate without interruption. Thereafter, sufficient data to complete the pass without interruption is received over the isochronous communications channel during the print pass. The high speed transfer rates afforded by isochronous data transfer allow for printing to be initiated before all of the data necessary to complete a print operation without interruption is received. Moreover, the size of a printer buffer used to store the print data before printing may be considerably reduced to store only a portion of the data needed for an entire print pass.

6 Claims, 8 Drawing Sheets

METHODS AND APPARATUS FOR ISOCHRONOUS PRINTING WITH MINIMAL BUFFERING

This is a continued prosecution application (CPA) of Ser. No 08/970,368, filed on Nov. 14, 1997

BACKGROUND OF THE INVENTION

1. Field of the Invention

The present invention relates generally to printing methods and apparatus, and more particularly to isochronous printing methods and apparatus that provide an isochronous communications channel between a host and a printer with guaranteed and predictable data throughput, and minimal buffering.

2. Description of Related Art

As printing technology advances, manufacturers are constantly seeking ways to maintain or reduce the costs of printers incorporating "hi-tech" modifications. For example, due to technological advances, printing speeds for grayscale and color printing certainly have increased over the past decades. Nevertheless, printer prices seem to remain stable and often decline. In some cases, increased printing speeds are realized by faster data transfer between network components, which may or may not affect printer cost.

In a printing environment, one or more printers typically communicate with one or more hosts either through a network connection or a dedicated communications channel. A host is a computer or "smart" printer that generates data formatted for the printer and sends the data over a selected communications channel. The type of communications channel may vary depending on the printing environment. For example, if several host computers communicate with one or more printers, such as in a local area network or wide area network, then the communication channel may be an asynchronous transfer mode (ATM) link. If a host computer is connected to several peripherals, such as a printer, over a fairly small area, then the communication channel may be a dedicated bus, such as Universal Serial Bus (USB).

When a user chooses to print a document, the host transfers the document as print data over one or more communications channels to the printer. The print data is transferable from the host at a specified data rate over one or more frames. A frame is a fixed unit of time in which the host transfers a predetermined amount of data. The host, however, may not allocate the entire frame for sending print data.

The printer may be a fixed inter-scan printer or a variable inter-scan printer. Both of these printers include a printing element that scans or passes, respectively, over a printer medium, such as paper. During the scan or pass, the printing element transfers the document, in the form of image data, onto the paper.

In a fixed inter-scan printer, the time between the end of one scan and the beginning of the next scan is constant and often determined by the print mechanism. For example, in a laser printer, the page is fed through continuously without pausing between scans. The printing element for a fixed inter-scan printer typically is a laser beam or LED array which does not actually move across the paper. The scan parameters usually include a scan period, laser speed, on-page time, off-page time and LED array fill time.

The scan period is the time from beginning one scan to the beginning of the next scan. The laser speed is the speed of the laser moving across the medium. The on-page time is the time the laser spends on the print medium and the off-page time is the time the laser is off the print medium. The LED array fill time is the time necessary to fill the LED array in preparation for pulsing (i.e., printing).

In a variable inter-scan printer, however, the time between the end of one pass and the beginning of the next pass is variable. For these printers, such as inkjet printers, the inter-scan time can be made longer or shorter to wait for print data. The printing element for these printers typically is an inkjet print head that passes over the paper. Print pass parameters for variable inter-scan printers typically include print speed, acceleration time, and deceleration time.

The Print speed is the speed of the inkjet print head during the print pass. The acceleration time is the time for the print head to reach printing speed. The deceleration time is measured from the printing speed to the time for the print head to completely stop.

Both fixed and variable inter-scan printers include a memory or "buffer" that temporarily stores data until the print mechanism is ready to begin printing. Typical fixed and variable scan printers include full-pass buffers that are large enough to hold an entire pass of data. For large documents, or when multiple users are sharing a single printer, the volume of print data received at the printer can be enormous, thus requiring a large buffer (e.g., 1–2 MBs). Due to the high price of memory units, increasing the size of the printer buffer to accommodate large amounts of print data can be very expensive.

In addition, printing systems typically use a specified communications protocol, which defines the way print data is transferred. For example, asynchronous communications protocol may be used to transfer print data over an ATM communications channel. In this example, the host and printer are configured to send and receive data using the asynchronous protocol. Some current systems rely on asynchronous protocol for implementing printing operations over a network.

U.S. Pat. No. 5,123,089 to Beilinski et al. discloses a printing configuration similar to that described above. FIG. 1 of Beilinski et al. illustrates a series of computer stations connected to printers through an apparent asynchronous communication link. A network node controller is positioned between each computer station and printer connection. The network node controller includes a buffer memory for storing print jobs ultimately executed by the connected printer. Although the network node controller allows the computer stations and printers to communicate, it adds to the cost and maintenance of the printing system. In addition, the network node controller buffer must be sufficiently large to support the transfer of print data between the computer stations and printers.

U.S. Pat. No. 4,371,950 to Chadra is directed to a peripheral controller for controlling data transfers between a main host computer and a printer mechanism. The peripheral controller includes a peripheral control interface circuit to control and monitor the printing of data and the paper format of the printer mechanism. The printing system of Chadra is similar to that of Beilinski in that a controller is positioned between the host computer and printer for controlling printing operations. In addition, Chadra teaches buffering a complete printing event before executing printing operations. As discussed above, this requires a buffer that is large enough to store an entire event before printing, which can be costly.

In an effort to increase dialogue between a host and printer, certain printing systems employ parallel communication channels. These parallel communication channels allow for bi-directional communication between the host computer and printer. Examples of printing systems using bi-directional communication are found in U.S. Pat. No. 5,075,875 to Love et al. and U.S. Pat. No. 5,507,003 to Pipkins.

Love et al. disclose a printer control system employing bi-directional communication between a host, printer and microprocessor. A parallel interface facilitates bi-directional communication by allowing the host and printer to carry on a dialogue. Pipkins discloses a protocol that provides bi-directional communication between the host and printer over a parallel interface. This reference mainly focuses on reverse channel operation between the host and printer to allow the transfer of data therebetween.

Although Love et al. and Pipkins describe processes for implementing bi-directional communication, neither of the references offer an effective method for increasing printing efficiency using this technology.

The Lexmark Optra E printer, developed by Lexmark International, Inc., includes Quick Print+™ technology for enhancing printing efficiency. In operation, the printer receives rasterized page data from a host over an asynchronous communications channel in bitmap form. Subsequently, the printer places initial bitmap data as dots on a page immediately freeing the printer controller memory and making way for a continuous flow of rasterized data until the image is completely printed. By operating in a "trust-me" mode, Quick Print+™ ensures that page data received from the host is not entirely resident in the printer's memory at any one time during the printing operation. Although Quick Print+™ does not require storing a complete page of data in the printer buffer during a printing operation, the bandwidth available to the incoming asynchronous communications channel is not guaranteed, resulting in possible transmission errors. Because the bandwidth is not guaranteed, the buffer must be sized to store a predetermined percentage of data before printing operations are initiated. Moreover, the Lexmark Optra E printer is a laser printer (i.e., a fixed inter-scan printer) and thus, the Quick Print+™ technology is limited to page scans.

Therefore, it is desirable to provide an improved printing system that offers guaranteed and predictable data throughput with minimal buffering.

It is also desirable to provide an improved printing system that allows a printer to communicate with a host computer for timely data transfer and effective printing operations.

It is yet further desirable to provide an improved printing system that is configurable to operate with both fixed inter-scan printers and variable inter-scan printers.

Additional desires, features and advantages of the invention will be set forth in the following description, and will be apparent from description or may be learned by practicing the invention.

SUMMARY OF THE INVENTION

Methods and apparatus consistent with the present invention meet these desires by providing an isochronous communications channel between a host and a printer with guaranteed and predictable data throughput.

Specifically, isochronous printing methods and apparatus consistent with this invention, include a method of printing comprising the steps of storing at a peripheral printer a sufficient volume of data received from a host over an isochronous data channel, to begin but not complete one print pass for the printer; beginning the print pass; and thereafter, receiving over the isochronous data channel, during the print pass, sufficient data to complete the pass without interruption.

A printer comprises a print mechanism capable of completing one print pass at a time without interruption; a memory for storing data consumed by the print mechanism during the print pass; and a control logic module in communication with the print mechanism, memory and a host over an isochronous communications channel. The control logic module initiates the print pass after receiving from the host a sufficient volume of data to begin, but not complete, the print pass and accepts over the isochronous communications channel, during said print pass, sufficient data to complete the print pass without interruption.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings.

DETAILED DESCRIPTION OF THE PREFERRED EMBODIMENTS

Reference will now be made in detail to the construction and operation of preferred embodiments consistent with the present invention illustrated in the accompanying drawings. In those drawings, like elements and operations are designated with the same reference numbers.

Embodiments consistent with the present invention are directed to providing isochronous data transfers over one or more communication channels between a host and a printer. Isochronous data transfer provides a guaranteed and predictable transfer of data between the host and printer in one or more frames. By using isochronous data transfer with guaranteed data throughput, a minimal buffer size may be employed in the printer to significantly reduced printer manufacturing costs without compromising accuracy and efficiency.

Isochronous data transfer and minimal buffering methods are described herein for both variable and fixed inter-scan printers. Specifically, variable inter-scan printers are discussed with respect to FIGS. 1–6 and fixed inter-scan printers are discussed with respect to FIG. 7–9.

Figure 1:
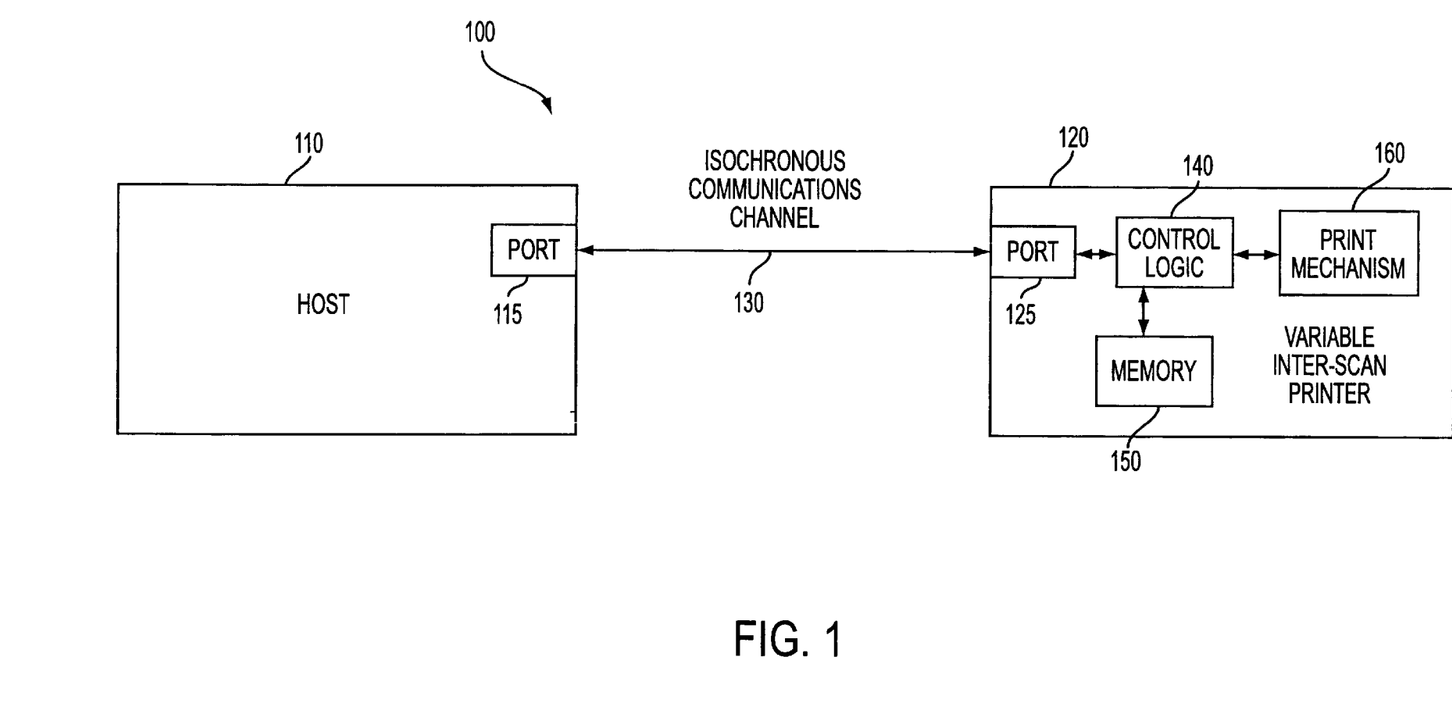
FIG. 1 is a block diagram of a printing system employing a variable inter-scan printer consistent with the present invention.

FIG. 1 is a block diagram of a printing system 100 consistent with the present invention. Printing system 100 includes a host 110, printer 120, and isochronous communications channel 130.

Preferably, host 110 is a computer capable of generating data formatted for printer 120. The host may also be a "smart" printer that is also capable of generating data formatted for printer 120 and sending the data over isochronous communications channel 130.

The computer preferably includes a central processing unit, an input device, and an output device. The central processing unit includes a processor, such as a Pentium® processor manufactured by Intel Corporation. The input device should include at least a keyboard and mouse. The output device should include at least a monitor.

Host 110 further includes a port 115 through which data is sent to and received from printer 120. Preferably, port 115 is configured to receive a cable or other interface supporting bi-directional data transfer.

Printer 120 is a variable inter-scan printer and includes a port 125, control logic circuit 140, memory 150, and print mechanism 160. Data received from, and sent to host 110 passes through port 125 of printer 120 over isochronous communications channel 130. In at least one embodiment consistent with the present invention, port 125 allows the printer to provide feedback to the host for executing synchronous printing operations.

Control logic circuit 140 executes the processing functions of printer 120. In particular, circuit 140 communicates with port 125 to send and receive data that is subsequently processed for printing. The processing involves reading the data received from the host, manipulating the data, if necessary, for printing, and communicating with the host for further data or instructions. Once the print data is in a proper printing format, control logic circuit 140 controls the operation of memory 150 and print mechanism 160 as described below.

Print data received from host 110, and processed by circuit 140, is temporarily stored in memory 150 prior to printing. Memory 150 communicates with circuit 140 and buffers one or more frames of print data during a printing operation. Preferably, the size of the memory 150 is smaller than that necessary to complete an entire print pass. For example, if a print pass requires 1 MB of print data, then maximum capacity of memory 150 is less than 1 MB. The actual size of memory 150 may vary depending on the type of printing operation employed. Formulas for calculating the capacity of memory 150 for printing embodiments using variable inter-scan printers are provided below.

Memory 150 holds print data until print mechanism 160 is ready to print. Print mechanism 160 receives data from memory 150 through control logic circuit 140 and transfers an image of the print data to a print medium, such as paper. Preferably, for a variable interscan printer 120, print mechanism 160 includes an inkjet print head that passes over the paper. Control logic circuit 140 controls the release of print data to, and the operation of print mechanism 160.

Isochronous communications channel 130 provides the effective communication between host 110 and printer 120 with guaranteed bandwidth and latency. Channel 130 includes a bus that supports isochronous data transfers. Preferably, the bus is a computer peripheral link, such as USB and IEEE-1394 (i.e., "Firewire"), designed to connect a host computer and several peripherals over a fairly small area. Isochronous communications between host 110 and printer 120 takes place within fixed-period frames. Isochronous communications guarantees the transfer of a fixed amount of data during the frame and the data may be sent any time within the frame.

Embodiments consistent with the present invention use isochronous communications channel 130 without synchronizing print mechanism 160 to the frame rate. Preferably, one pass of print mechanism 160 requires an acceleration phase, a constant-speed phase where the printing occurs, and a deceleration phase. Host 110 transfers print data to printer 120 in single-pass bundles such that synchronization between the host and printer occurs between printing phases. The speed of print mechanism 160 during the constant-speed phase actually varies within some tolerance above and below a desired printing speed. This variation must be taken into account when determining the appropriate size of memory 150. The formulas provided below assume that the print mechanism speed is constant for a given print speed.

Figure 2:
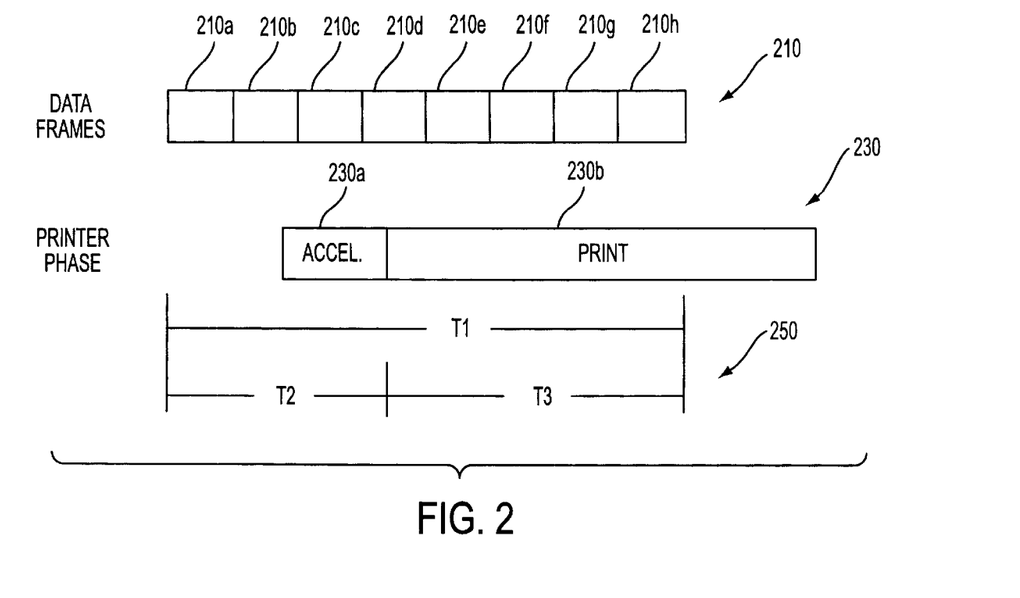
FIG. 2 is an illustration of a first printing embodiment consistent with the present invention.

FIG. 2 is an illustration of a first printing embodiment consistent with the present invention where print data is buffered before printing starts.

To illustrate a printing operation of the first printing embodiment, FIG. 2 includes data frames 210, printer phase 230, and a timeline 250. Data frames 210 include the frames 210a–210h of print data sent from host 110 to printer 120. Printer phase 230 includes an acceleration phase 230a and a printing phase 230b, and illustrates the state of print mechanism 160 during a complete printing event. Finally, timeline 250 shows the entire data frame transfer period (T1); the period between the start of data frame transfer and the end of the printer acceleration phase (T2); and the period between the start of constant-speed printing and the end of data frame transfer (T3).

During the printing operation of FIG. 2, the host sends print data for one pass to the printer at a constant rate. Control logic circuit 140 receives data from host 110 and starts the acceleration phase of print mechanism 160. Memory 150 buffers the transferred print data until the print head reaches a print start position. Print mechanism 160 begins to consume the data (i.e., prints the data on a medium) while circuit 140 continues to receive data over isochronous communications link 130. Host 110 optionally stops sending data to printer 120 once data for a complete print pass is sent.

To facilitate the printer operation of the first printing embodiment, the printer provides a memory of sufficient size to prevent overflow and times the start of the print mechanism to prevent underflow. Data overflow occurs when the amount of data at printer 120 exceeds the memory or buffer capacity at any one time. Data underflow occurs when the size of the pass data ($S_p$) is greater than the sum of the data in memory 150 at the start of printing and the data received during printing.

Preferably, print mechanism 160 starts at the end of the frame that receives the first data (i.e., either frame 210a or frame 210b). If the data rate of the print mechanism ($R_p$) is greater than the data rate of the isochronous communications channel ($R_c$), and the pass is sized to prevent data underflow, then memory 150 must be of sufficient size to hold print data received during frames 210c and 210d. Data is received in these frames during acceleration phase 230a. The number of frames for the acceleration phase is $T_a/T_f$, where $T_a$ is the acceleration time and $T_f$ is the frame time. Therefore, the minimum size of the buffer to prevent data overflow during the acceleration phase is defined using the formula $S_f\lceil Ta/T_f+2\rceil$, where $S_f$ is the size of the data sent over the isochronous channel for each frame.

The number of data frames received during printing phase 230b is at least $T_p/T_f$ where $T_p$ is the print time, minus one frame because the print period and frame period are asynchronous. Therefore, the amount of buffered data must be at least $S_p-S_f\lceil T_p/T_f-1\rceil$ when printing begins. To insure that data underflow does not occur, it may be necessary to delay starting the print mechanism after receiving the first frame of data. Although underflow does not occur when $R_p$ is less than or equal to $R_c$, the buffer must be sized to prevent data overflow during printing phase 230b. In this instance, host 110 sends data to printer 120 in $S_p/S_f$ frames.

Referring now to timeline 250 of FIG. 2, T1, T2 and T3 are defined as follows:

$$T1 = \lceil S_p/S_f \rceil T_f,$$
$$T2 = T_a + T_f, \text{ and}$$
$$T3 = T1 - T2 = \lceil S_p - S_f - 1\rceil T_f - T_a.$$

When host 110 sends data for an entire pass, print mechanism 160 uses $R_pT3$ amount of data. Therefore, the minimum buffer size necessary to complete a printing operation is the difference of the size of the pass $S_p$ and the amount of data print mechanism 160 uses when it receives the last frame of pass data, represented by $S_p-R_p(\lceil S_p/S_f-1\rceil T_f-T_a)$.

An example of the buffer size necessary to complete a printing operation in the first printing embodiment is provided below using the above equation. First, assuming that:

$$S_p = 231 \text{ kB};$$
$$R_p = 500 \text{ kB/s};$$
$$S_f = 600 \text{ B};$$
$$T_f = 1 \text{ ms; and}$$
$$T_a = 52 \text{ ms}.$$

the minimum buffer size needed to complete the first printing operation described above is calculated as:

$$\text{Buffer}_{min} = S_p - R_p(\lceil S_p/S_f - 1\rceil T_f - T_a),$$
$$= 231 \text{ kB} - 500 \text{ kB/s}(\lceil 231 \text{ kB}/600 \text{ B} - 1\rceil 1 - \text{ms} - 52 \text{ ms})$$
$$= 65 \text{ kB}$$

In the first printing embodiment illustrated in FIG. 2, printer 120 receives at least one frame of print data before initializing the acceleration phase of print mechanism 160. Once initialized, print mechanism 160 consumes the buffered print data while continuing to receive print data from host 110. As shown by the above example, the first printing operation requires a buffer of 65 kB to successfully print a pass size of 231 kB. Using a minimal buffer size as indicated by this example, allows a manufacturer to build a faster, yet less expensive printer when compared to printers currently available.

Figure 3:
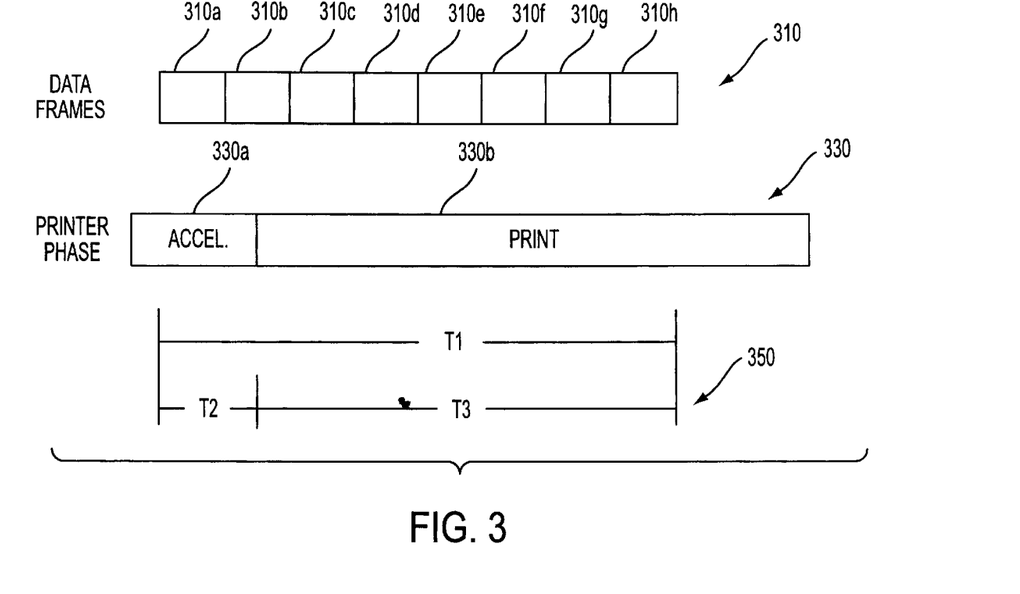
FIG. 3 is an illustration of a second printing embodiment consistent with the present invention.

FIG. 3 is an illustration of a second printing embodiment consistent with the present invention. In this second printing embodiment, printer 120 provides feedback to host 110, over a designated communications channel, to efficiently time the transfer of print data. By comparison, the first printing embodiment of FIG. 2, does not include feedback capabilities. In the second printing embodiment, minimal buffering is realized by delaying the start of data transmission until print mechanism 160 is closer to the start of printing. First, host 110 sends printer 120 a message indicating that data is available for the next pass. When printer 120 receives the data-ready message, it starts print mechanism 160. When the print mechanism is $T_s$ (i.e., time from the start message transmission to the start of print mechanism data consumption) before printing is to start, the printer sends a start message to the host to initiate data transfer. Alternatively, the start message includes a printing start time that allows the host to synchronize data transfer with the start of printing operations.

To illustrate a printing operation of the second printing embodiment, FIG. 3 includes data frames 310, printer phase 330, and a timeline 350. Data frames 310 include frames 310a–310h of print data sent from host 110 to printer 120. Printer phase 330 includes an acceleration phase 330a and a printing phase 330b, and illustrates the state of print mechanism 160 during a complete printing event. Finally, timeline 350 shows the entire data frame transfer period (T1); the period between the start of data frame transfer and the end of the printer acceleration phase (T2); and the period between the start of constant-speed printing and the end of data frame transfer (T3). In this embodiment, T1, T2, and T3 are defined as follows:

$$T1 = \lceil S_p/S_f \rceil T_f,$$
$$T2 = T_s + T_f, \text{ and}$$
$$T3 = T1 - T2 = \lceil S_p/S_f \rceil T_f - (T_s - T_f)$$

Assuming that host 110 sends data in frame 310a, the required buffer size calculation to prevent overflow and underflow is similar to that of the first printing embodiment. When the data rate of the print mechanism ($R_p$) is greater than the data rate of the isochronous communications channel ($R_c$), the required buffer size is calculated as max $(S_f\lceil T_s/T_f\rceil,S_p-S_f\lceil T_p/T_f-1\rceil)$. To prevent overflow when $R_p$ is less than or equal to $R_c$, the buffer must be large enough to hold the size of the pass data minus the data used by print mechanism 160 while receiving data from host 110.

In the second printing embodiment of FIG. 3, print mechanism 160 starts the acceleration phase before host 110 begins to send data (i.e., $T_s<T_a$). Therefore, to prevent overflow, the buffer is represented as $S_p-R_p(\lceil S_p/S_f+1\rceil T_f-T_s)$. Since the printer phase starts prior to sending data, the buffer size of the second printing embodiment is less than or equal to the first printing embodiment buffer size.

As an example, the buffer size necessary to complete a printing operation in the second printing embodiment is calculated below using the following parameters:

$$S_p = 231 \text{ kB};$$
$$R_p = 500 \text{ kB/s};$$
$$S_f = 600 \text{ B};$$
$$T_f = 1 \text{ ms; and}$$
$$T_s = 10 \text{ ms}.$$

The minimum buffer size needed to complete the second printing operation described above is calculated as:

$$\text{Buffer}_{min} = S_p - R_p(\lceil S_p/S_f + 1\rceil T_f - T_s),$$

$$= 231\,\text{kB} - 500\,\text{kB}/\text{s}(\lceil 231\,\text{kB}/600\,\text{B} + 1\rceil 1\,\text{ms} - 10\,\text{ms})$$

$$= 43\,\text{kB}$$

The buffer size for the second printing embodiment is less than that of the first printing embodiment, as illustrated by the above example, because print mechanism 160 accelerates prior to receiving data in the second printing embodiment. However, the buffer size must be at least 2 * $S_f$. In this case, print data is consumed by print mechanism 160 almost immediately upon receipt.

Figure 4:
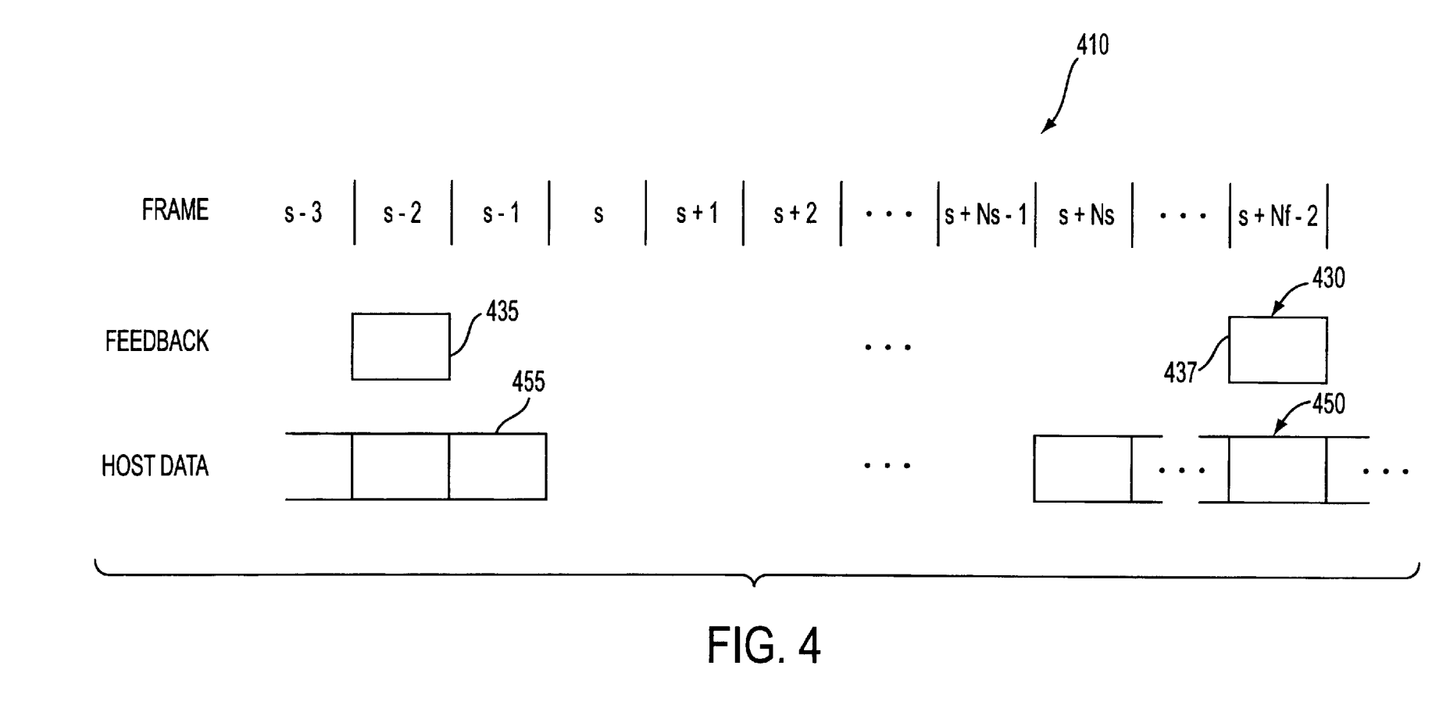
FIG. 4 is an illustration of a third printing embodiment consistent with the present invention.

FIG. 4 is an illustration of a third printing embodiment consistent with the present invention. In this embodiment, a communications channel is available to printer 120 to periodically send feedback messages to host 110 to trigger the transfer of print data. The illustration of the third printing embodiment of FIG. 4 includes frames 410, feedback data frames 430 and host data frames 450.

Frames 410 include a reference frame s with preceding frames (i.e., "s−3" to "s−1") and subsequent frames (i.e., "s+1" to "s+$N_f$−2"). Feedback data frames 430 include data frames 435 and 437 which are periodically transferred from printer 120 to host 110. Finally, host data frames 450 include data frames 455 which are transferred from host 110 to printer 120 in response to the feedback message sent in data frames 435.

In this printing embodiment, the data rate of the isochronous communications channel ($R_c$) is greater than the data rate of the print mechanism ($R_p$). During operation, printer 120 sends a feedback message to host 110 over the isochronous communications channel every $N_f$ frames, instructing the host to delay data for zero or more frames. The delay is measured by the number of skipped frames $N_s$. Preferably, the feedback message includes instructions to skip at least one frame, such that $N_s>0$, to prevent data overflow. For example, upon receiving a feedback message from printer 120 with an "$N_s>0$ on frame n" instruction, host 110 may send data during frame (n+1), no data on frame (n+2), and resume sending data on frame (n+2)+$N_s$. For a minimum size buffer, printer 120 preferably sends feedback messages of $N_s=0$, or $N_s=1$. However, for a given $N_f$, $R_c$, and $R_p$, printer 120 may need to send a feedback message of $N_s>1$ to prevent data overflow.

Referring specifically to FIG. 4, printer 120 sends a feedback message data frame 435 requesting host 110 to skip frames s to (s+$N_s$−1) on frame (s−2). The print data in frame (s+$N_s$) may not be received until the end of the frame due to the isochronous communication link. Therefore, from the start of frame (s−1) to the end of frame (s+$N_s$), the print mechanism data requirement is (2+$N_s$)$R_pT_f$.

Printer 120 receives print data, having a size $S_f$, during frame (s−1). Consequently, at the start of frame (s-i), the amount of data contained in the buffer (i.e., memory 150) is represented as (2+$N_s$)$R_pT_f$−$S_f$. Because the communication channels are isochronous, print data may come at the start of frame (s−1) so the buffer must be $S_f$ larger than the data required in the buffer at the start of the frame. Moreover, the buffer must be large enough for additional data having a size $S_f$ because the print mechanism and frame rate are asynchronous. Hence, the minimum buffer size for the third printing embodiment described herein is represented as (2+$N_s$)$R_pT_f$+$S_f$.

As an example, the buffer size necessary to complete a printing operation in the third printing embodiment is calculated below using the following parameters:

$N_s = 4\,\text{frames};$ $R_p = 500\,\text{kB}/\text{s};$ $S_f = 600\,\text{B};\text{ and}$ $T_f = 1\,\text{ms}.$ The minimum buffer size needed to complete the third printing operation described above is calculated as:

$$\text{Buffer}_{min} = (2 + N_s)R_pT_f + S_f$$

$$= (2 + 4)500\,\text{kB}/\text{s} * 1\,\text{ms} + 600\,\text{kB}$$

$$= 3.6\,\text{kB}$$

The buffer size for the third printing embodiment is significantly lower than that of the first and second printing embodiments, as illustrated by the above example. The buffer size can be further reduced if the number of skipped frames is reduced. For example, for $N_s=1$, the minimum buffer size equals 2.1 kB. The buffer requirements for the third printing embodiment ensure that enough memory is available to store data received before, and immediately after the skipped frames.

Alternatively, an aperiodic feedback printing operation may be employed if a feedback channel is available (i.e., bi-directional communication), such as in the second and third printing embodiments. In an aperiodic printing operation, host 110 can delay sending data from one frame to a later frame, such that $R_c>R_p$, and the printer can aperiodically send a feedback message to one or more frames. Assuming the printer can send a feedback message on any frame, all feedback messages can cause a delay of at least one frame. The minimum buffer size is the same as that in the third printing embodiment with $N_s=1$. In this case, the minimum buffer size is represented as 3$R_pT_f$+$S_f$.

As a further alternative, printer 120 may use a variable host data rate for printing operations using isochronous communications channels. In this alternative, host 110 sends a variable amount of data from frame to frame with the amount of data controlled by printer feedback. That is, printer 120 calculates the data requirement of print mechanism 160 for a future frame and sends the requirement as a feedback message to host 110. Periodic feedback may be used to have a set data amount sent from host 110 at regular intervals. Aperiodic feedback may be used when printer 120 sends a feedback message to host 110 only when the data sent per frame by the host needs to be adjusted. For example, upon receiving the feedback message in a frame n, host 110 sends the specified data amount starting $N_a$ frames (i.e., the number of frames host 110 takes to adjust its output data rate) later in frame (n+$N_a$). The buffer size required, in this alternative, is a function of the feedback rate $R_p$ and $N_a$. Preferably, $N_a=1$, such that host 110 sends the requested amount of data on the next frame, If the feedback message is sent after the print data within the same frame, then the buffer size required, defined as 2$R_pT_f$, is the amount of data print mechanism 160 consumes during two frames.

The printing embodiments described above offer different alternatives to using isochronous communications to provide guaranteed data throughput with minimal buffering. Printing system 100 achieves these isochronous data transfer objectives using a single communications channel (e.g., the first printing embodiment), or plural communications channels (e.g., the second and third printing embodiments).

Figure 5:
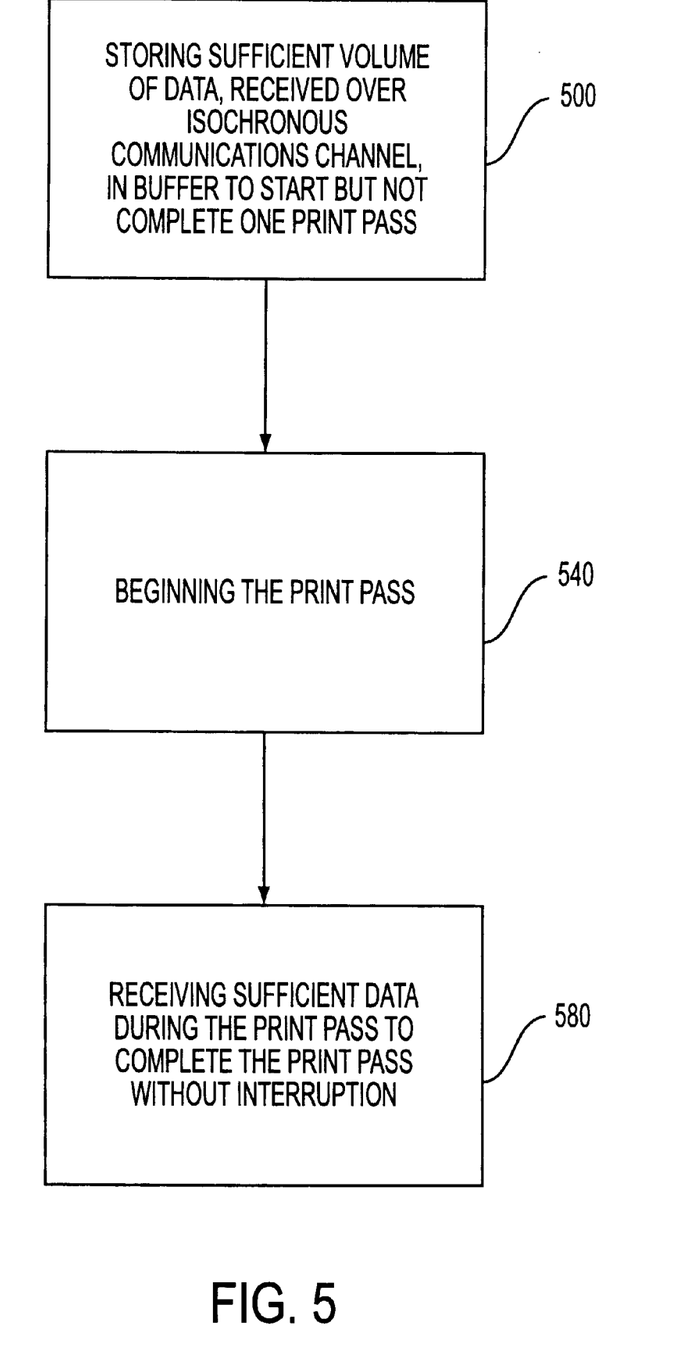
FIG. 5 is a flowchart of a first method of printing using isochronous data transfer consistent with the present invention.
Figure 6:
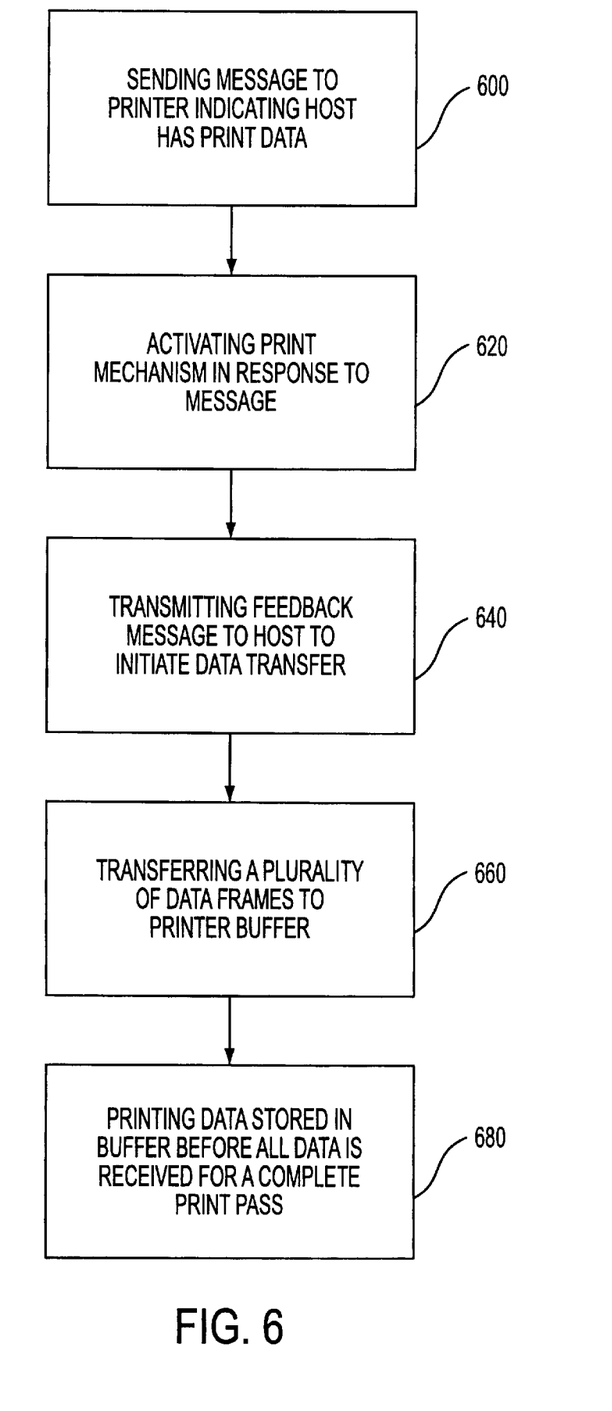
FIG. 6 is a flowchart of a second method of printing using isochronous data transfer consistent with the present invention.

FIGS. 5 and 6 are flowcharts of a first and second method of printing, respectively, using the isochronous data transfer operations described in the above embodiments.

The flowchart of FIG. 5 illustrates a first method of printing beginning with the step of storing a sufficient volume of data, received over an isochronous communications channel, to start, but not complete, one print pass of a printing medium (step 500). The printer mechanism then begins its print pass, consuming the data temporarily stored in the buffer (step 540). Finally, during the print pass, the print mechanism receives sufficient data to complete the print pass without interruption (step 580). This method applies to all of the aforementioned printing embodiments. However, please note that the acceleration phase of the print pass in the second embodiment starts before data is received over the isochronous communications channel. Thus, step 540 of FIG. 5 only refers to the actual printing phase of the print pass with regard to the second printing embodiment.

The flowchart of FIG. 6 highlights the feedback feature described in several embodiments consistent with the present invention. Initially, the host sends a message to the printer indicating that it has print data (step 600). In response to the message, the printer activates the print mechanism (step 620). Subsequently, the printer transmits a feedback message to the host to initiate data transfer (step 640). The host then transfers a plurality of data frames to the printer buffer (step 660). Finally, the print mechanism begins printing data stored in the buffer before receiving the necessary print data to complete an entire print pass (step 680).

The foregoing detailed description relates to variable inter-scan printers. The following detailed description provides isochronous data transfer and minimal buffering methods for fixed inter-scan printers.

Figure 7:
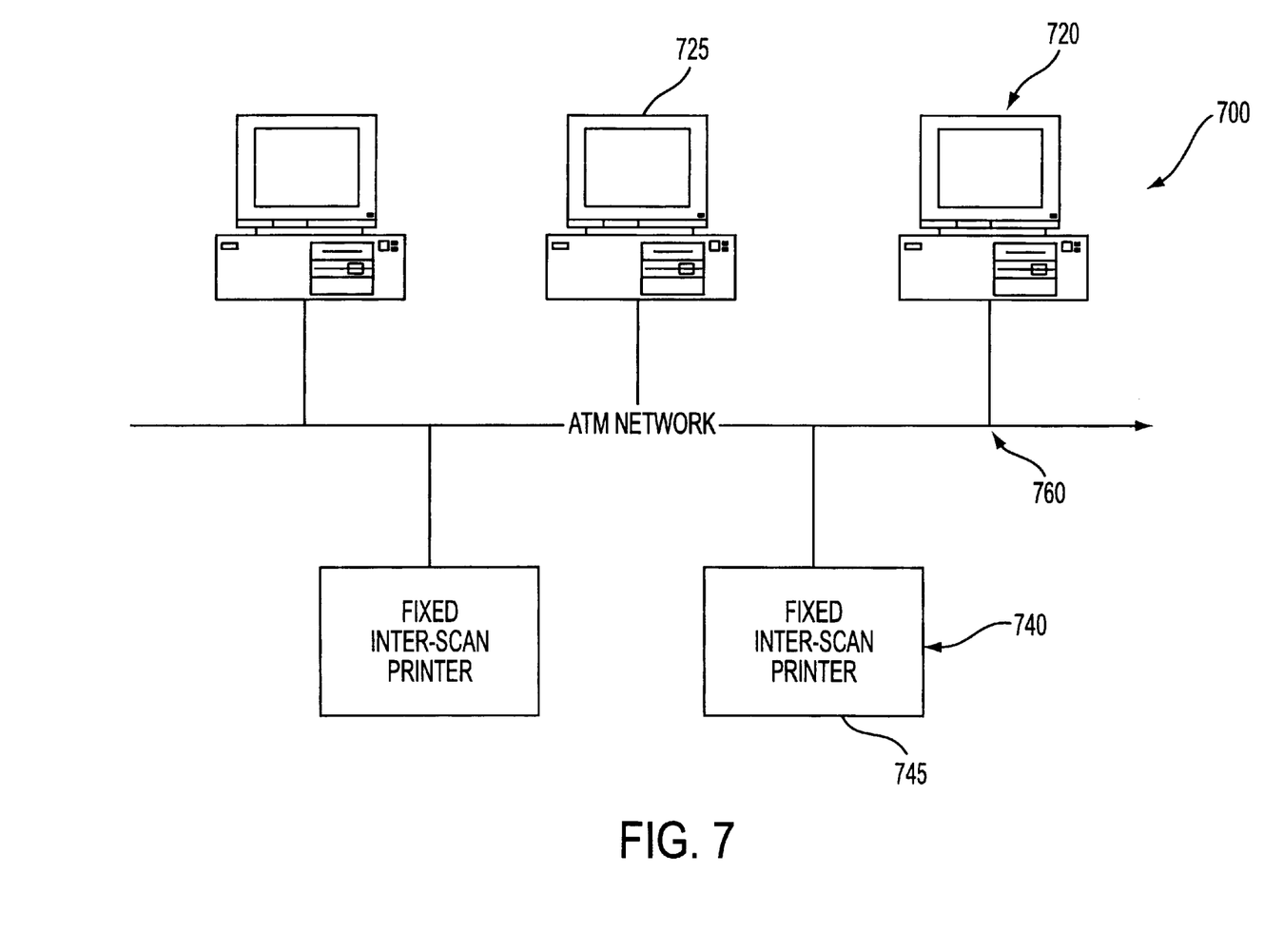
FIG. 7 is a diagram of a plurality of hosts connected to a series of fixed inter-scan printers over an ATM network.

FIG. 7 is a diagram of a printing network 700 consistent with the present invention. Printing network 700 includes a plurality of sources 720 in communication with a series of targets 740 over an ATM network 760. Preferably, sources 720 include one or more computers 725 adapted to send preformatted print data to printers 740 using isochronous data transfer techniques. Alternatively, "smart" printers can be used as hosts in printing network 700. Preferably, targets 740 include one or more fixed inter-scan printers 745 (e.g., laser printers). In these printers, an entire page is fed through continuously and without interruption between scans. ATM network 760 is a communications link that transfers data packets between network components with a minimum level of quality of service (QoS) guarantees. In addition, ATM network 760 has bi-directional capabilities and supports both local area networks (LANs) and wide area networks (WANs). Alternatively, a full-duplex, star-configured switching hub may provide the communications link for printing network 700.

Printing network 700 implements a form of per-scan handshaking using the bi-directional capabilities of ATM network 760. Using QoS features of current high bandwidth isochronous networks, such as ATM network 760, communications from the source can be synchronized with the scan rate of the printer, meeting inter-scan timing constraints. In cases where the source has a direct full-duplex connection of sufficient bandwidth to a switched hub having isochronous or other similar connection to the target, the source can arrange to schedule data delivery without an explicit requirement of isochronicity between the source and the switched hub. For this embodiment, an isochronous data transfer is established between the switched hub and the target.

Figure 8:
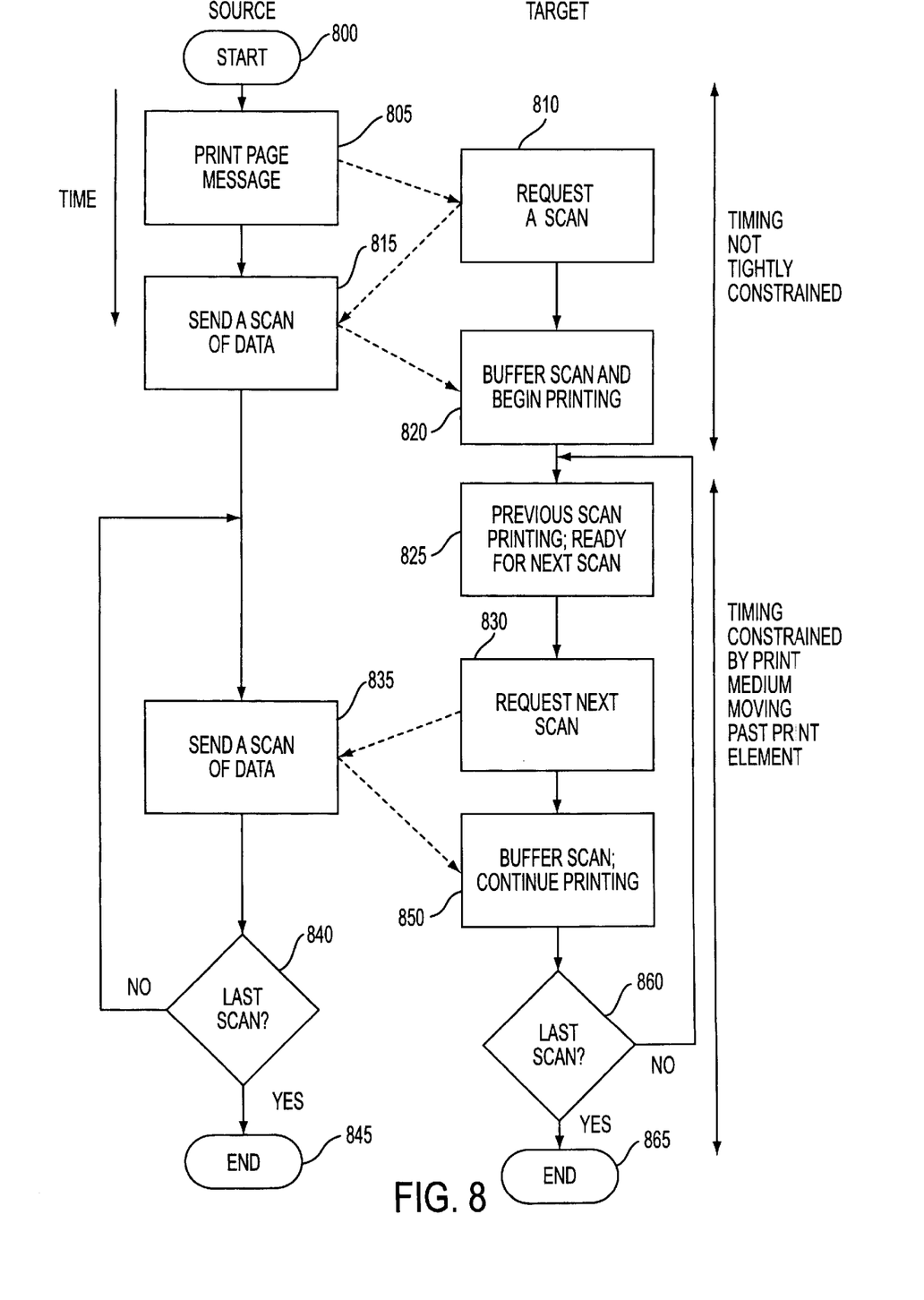
FIG. 8 is a flowchart of a method of printing using isochronous data transfer over a local area network.

FIG. 8 is a flowchart of a method of printing using isochronous data transfer over a LAN. Since transmission delay is negligible when using ATM, the method of FIG. 8 uses real-time handshaking between source 720 and target 740.

Referring to FIG. 8, the source initiates printing operations (step 800). The source then sends a print page message to the target (step 805). Upon receiving the print page message, the target signals the source to initiate transfer of the first scan (step 810). In response, the source sends a scan of data to the target (step 815). The target stores the scan in memory and begins the printing operation (step 820). It is important to note that during steps 800–820, timing between the source and the target is not constrained. In the remaining steps, however, time is constrained since the source must keep up with the target's fixed inter-scan times as the print medium (e.g., paper) moves past the print element.

While the first scan is printing, the target is able to receive another scan (step 825) and requests a second scan from the source (step 830). In response to the request, the source sends a second scan to the target (step 835). After sending the second scan, the source determines whether any scans remain. If the second scan is the last scan for printing (step 840), the source takes no further action (step 845). If other scans still need printing, the source sends each remaining scan to the target when prompted (step 835).

Once the source sends another scan, the target buffers the scan in memory (step 850). If the target fails to receive another scan, then the target assumes that the scan currently printing is the last scan and completes the printing operation (steps 860 and 865). Assuming that another scan is received, the target prints the new scan immediately after completing the first print scan and seeks further scans from the source (steps 850, 825 and 830). The target repeats steps 825-860 until it reaches the end of the print medium or until the source no longer has print data. In the method of FIG. 8, the printing network may recover some transmission errors during the inter-scan time, alleviating the need to start a new page and retransmit the entire page of data. This feature is one advantage of using the printing network described herein over a LAN, as opposed to a WAN which is described in detail below.

Figure 9:
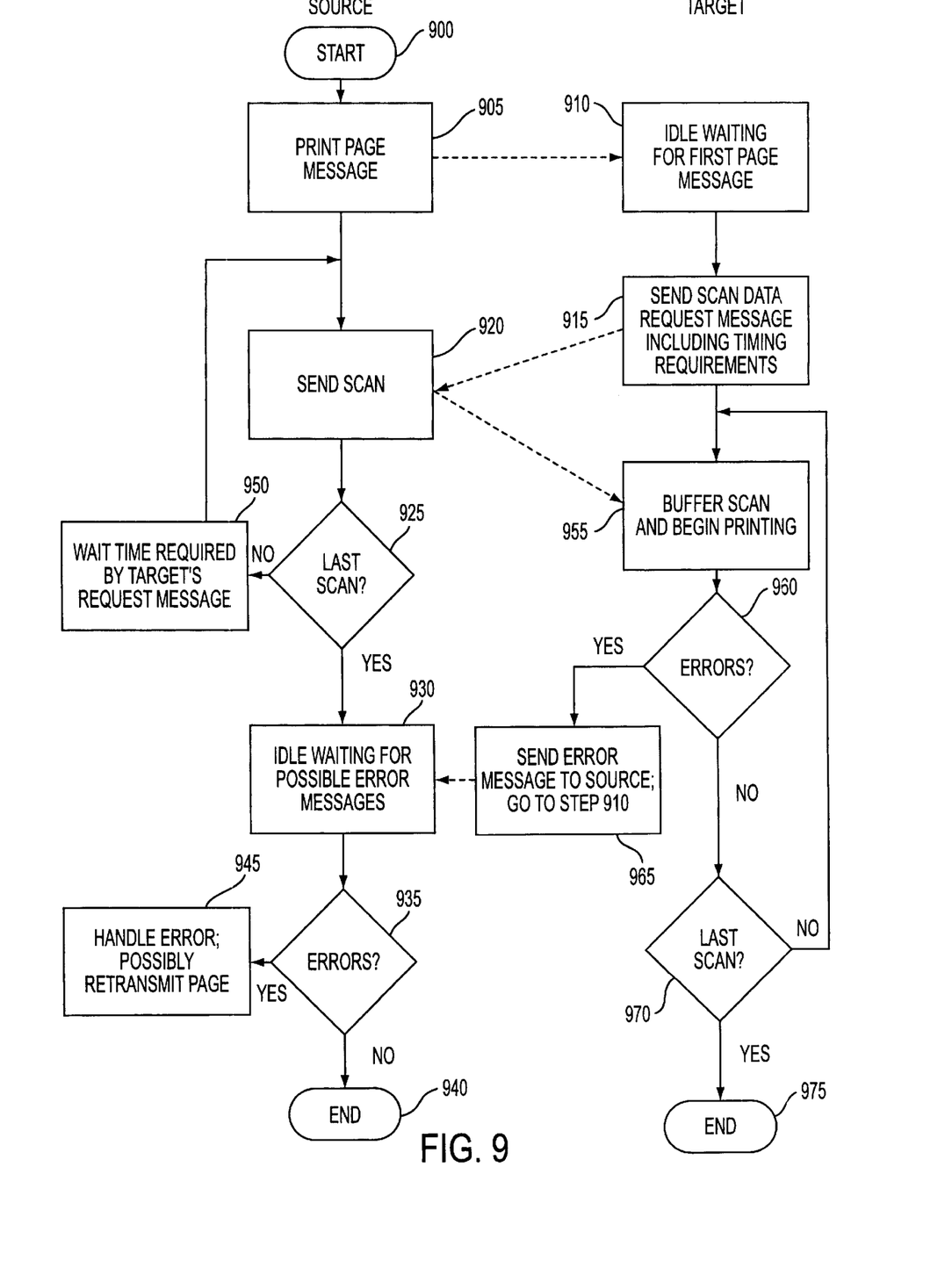
FIG. 9 is a flowchart of a method of printing using isochronous data transfer over a wide area network.

FIG. 9 is a flowchart of a method of printing using isochronous data transfer over a WAN. In WANs using satellite links, transmission delay may be significant. In this case, real-time handshaking may be impractical. The distinction between negligible and significant transmission delay can be made by a special timed request/response test sequence measuring the delay. From this test, a decision can be made as to whether real-time handshaking is appropriate. If not, data transmission using time-stamping or inherent isochronous link synchronization is a suitable replacement. In this method, the target printer generates a single data request specifying the inter-scan frequency. Subsequently, the source generates scanline data packages at exactly that frequency using the timing features of an isochronous communications link (e.g., ATM), or time stamping information for a non-isochronous link (e.g., 100 base-T Ethernet), assuming bandwidth requirements for real-time scanline transfer are satisfied. When the first scanline of data arrives at the target, printing can commence as long as the data responses arrive synchronized to the times specified in the data request. Missing scanline packages and other errors can be handled with error responses from the target to source, as illustrated in FIG. 9, resulting in a possible retransmission of the entire page of scanline data.

Referring to FIG. 9, the source initiates the printing operation by sending a print page message to the target (steps 900 and 905). The target waits idle until it receives the first page message (step 910). Upon receiving the print page message, the target requests scan data from the source including timing requirements (step 915). The source receives the request and sends a first scan to the target (step 920). If the first scan is the last scan of the printing operation, the source remains idle until it receives error messages from the target (step 930). If no errors are received, the source takes no further action (steps 935 and 940). If errors are received, the source preferably corrects that error by retransmitting the scan (steps 935 and 945).

Assuming that the first scan is not the last scan, the source waits according to the timing requirements sent by the target and continues to send scans, if available, when prompted by the target (steps 950 and 920).

When the target receives the first scan, and subsequent scans, it buffers the scan in memory and begins printing (step 955). If any errors are present, the target sends an error message to the source, which executes errorhandling steps 930–945, and resets to step 910 (steps 960 and 965). If no errors are present, the target determines whether it has received the last scan (step 970). This determination is made based on whether the target receives a scan when requested. If so, the target repeats steps 955–970 until no further scans are sent. If the target receives no further scans, it finishes printing the data stored in the buffer and stops (step 975).

The printing methods and apparatus described herein offer unique approaches for providing reliable printing operations with minimal buffering, resulting in improved printing techniques with significant cost savings. The printing embodiments directed to systems employing variable inter-scan printers are adaptable to conform to multiple printing environments based on the available communications channels and printer buffer size. In addition, the printing embodiments directed to systems employing fixed inter-scan printers offer multiple configurations and methods depending on whether the printer is connected to a LAN or WAN. Isochronous data transfer used in the printing environments described above allows for increased printing speeds and minimal buffering not seen in conventional printing systems, Although the foregoing description relates to printers, the disclosed isochronous data transfer techniques are applicable to other data consumption devices such as audio speakers, monitors and telephones. If the direction of the data and feedback are reversed, then these techniques may be used with other data sources, such as scanners.

While there has been illustrated and described what are at present considered to be preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A method for transferring data between a printer that operates in a plurality of data passes, and a host, said method comprising:

(a) providing a host, a printer, and an isochronous data channel therebetween that provides a guaranteed and predictable data transfer bandwidth over at least a single print pass, said printer having a memory circuit, a processing circuit, and a print engine, said memory circuit containing a buffer that is sized to prevent a data overflow;

(b) transmitting from said host to said printer over said isochronous data channel a message that print data is available for a print pass, and starting said print engine so as to be ready for receiving print data for consumption;

(c) transmitting from said printer to said host over said isochronous data channel an initial feedback message that said printer is ready to receive print data from said host for said print pass, said initial feedback message exhibiting periodic timing;

(d) transmitting from said host to said printer over said isochronous data channel at least one frame of print data, storing if necessary said at least one frame of print data in the memory circuit of said printer, and initiating consumption of said print pass before all data necessary to complete said print pass has been received at said printer;

(e) further transmitting from said printer to said host over said isochronous data channel at least one further feedback message that said printer is ready to receive further print data from said host for said print pass, said at least one further feedback message exhibiting periodic timing;

(f) after receiving said at least one further feedback message from said printer, further transmitting from said host to said printer over said isochronous data channel at least one additional frame of print data before completion of said print pass, said at least one additional frame of print data containing sufficient data to complete said print pass, once initiated, without interruption; and (g) wherein a data size per frame is variable, and said at least one further feedback message further instructs said host as to the data size of each at least one additional frame of print data, thereby resulting in a necessary size of said buffer being made smaller.

2. A method method for transferring data between a printer that operates in a plurality of data passes, and a host, said method comprising:

(a) providing a host, a printer, and an isochronous data channel therebetween that provides a guaranteed and predictable data transfer bandwidth over at least a single print pass, said printer having a memory circuit, a processing circuit, and a print engine, said memory circuit containing a buffer that is sized to prevent a data overflow;

(b) transmitting from said host to said printer over said isochronous data channel a message that print data is available for a print pass, and starting said print engine so as to be ready for receiving print data for consumption;

(c) transmitting from said printer to said host over said isochronous data channel an initial feedback message that said printer is ready to receive print data from said host for said print pass, said initial feedback message exhibiting periodic timing;

(d) transmitting from said host to said printer over said isochronous data channel at least one frame of print data, storing if necessary said at least one frame of print data in the memory circuit of said printer, and initiating consumption of said print pass before all data necessary to complete said print pass has been received at said printer;

(e) further transmitting from said printer to said host over said isochronous data channel at least one further feedback message that said printer is ready to receive further print data from said host for said print pass, said at least one further feedback message exhibiting periodic timing;

(f) after receiving said at least one further feedback message from said printer, further transmitting from said host to said printer over said isochronous data channel at least one additional frame of print data before completion of said print pass, said at least one additional frame of print data containing sufficient data to complete said print pass, once initiated, without interruption; and (g) wherein a data size per frame is variable, and said at least one further feedback message is sent by said printer to said host only at times when the data size of each at least one additional frame of print data needs to be adjusted, thereby resulting in a necessary size of said buffer being made smaller.

3. A method method for transferring data between a printer that operates in a plurality of data passes, and a host, said method comprising:

(a) providing a host, a printer, and an isochronous data channel therebetween that provides a guaranteed and predictable data transfer bandwidth over at least a single print pass, said printer having a memory circuit, a processing circuit, and a print engine, said memory circuit containing a buffer that is sized to prevent a data overflow;

(b) transmitting from said host to said printer over said isochronous data channel a message that print data is available for a print pass, and starting said print engine so as to be ready for receiving print data for consumption;

(c) transmitting from said printer to said host over said isochronous data channel an initial feedback message that said printer is ready to receive print data from said host for said print pass;

(d) transmitting from said host to said printer over said isochronous data channel at least one frame of print data, storing if necessary said at least one frame of print data in the memory circuit of said printer, and initiating consumption of said print pass before all data necessary to complete said print pass has been received at said printer;

(e) further transmitting from said printer to said host over said isochronous data channel at least one further feedback message that said printer is ready to receive further print data from said host for said print pass;

(f) after receiving said at least one further feedback message from said printer, further transmitting from said host to said printer over said isochronous data channel at least one additional frame of print data before completion of said print pass, said at least one additional frame of print data containing sufficient data to complete said print pass, once initiated, without interruption; and (g) wherein a data size per frame is constant, and said at least one further feedback message exhibits aperiodic timing by way of said host delaying sending said at least one additional frame of print data until receiving a feedback message from said printer indicating that said printer requires at least one more frame of print data.

4. A method for transferring data between a printer that operates in a plurality of data passes, and a host, said method comprising:

(a) providing a host, a printer, and an isochronous data channel therebetween that provides a guaranteed and predictable data transfer bandwidth over at least a single print pass, said printer having a memory circuit, a processing circuit, and a print engine, said memory circuit containing a buffer that is sized to prevent a data overflow;

(b) transmitting from said host to said printer over said isochronous data channel a message that print data is available for a print pass, and starting said print engine so as to be ready for receiving print data for consumption;

(c) transmitting from said printer to said host over said isochronous data channel an initial feedback message that said printer is ready to receive print data from said host for said print pass, said initial feedback message exhibiting periodic timing;

(d) transmitting from said host to said printer over said isochronous data channel at least one frame of print data, storing if necessary said at least one frame of print data in the memory circuit of said printer, and initiating consumption of said print pass before all data necessary to complete said print pass has been received at said printer;

(e) further transmitting from said printer to said host over said isochronous data channel at least one further feedback message that said printer is ready to receive further print data from said host for said print pass, said at least one further feedback message exhibiting periodic timing;

(f) after receiving said at least one further feedback message from said printer, further transmitting from said host to said printer over said isochronous data channel at least one additional frame of print data before completion of said print pass, said at least one additional frame of print data containing sufficient data to complete said print pass, once initiated, without interruption; and (g) wherein said at least one further feedback message further instructs said host to delay sending a next set of print data by skipping at least one available time interval.

5. The method as recited in claim 4, wherein a data size per frame is constant, and a necessary size of said buffer is made smaller by reducing a number of skipped frames.

6. A method of data transfer over an isochronous channel between a peripheral and a host over a wide area network, comprising the steps of:

sending a signal from the host over said isochronous channel that provides a guaranteed and predictable data transfer bandwidth over at least a single scanline data package informing the peripheral of a page print request;

responding to the host by said peripheral requesting a first scanline of data packages to be sent at a specified frequency;

transferring the first scanline data packages from the host to the peripheral at the specified frequency;

said peripheral buffering at least a portion of the first scanline of data packages transferred from the host;

said peripheral printing the first scanline data packages on a print media; and timing the transmission of subsequent scanline data packages to insure that the peripheral has sufficient number of subsequent scanline data packages to continue printing without interruption;

wherein said peripheral specifies an inter-scan frequency to said host relating to timing of future passes.

* * * * *

UNITED STATES PATENT AND TRADEMARK OFFICE
CERTIFICATE OF CORRECTION

PATENT NO : 6,097,499
DATED : August 1, 2000
INVENTOR(S) : Patrick Alan Casey, et al.

It is certified that error appears in the above-identified patent and that said Letters Patent are hereby corrected as shown below:

Col. 14, line 37
replace "method method" with --method--.

Col. 15, line 18
replace "method method" with --method--.

Signed and Sealed this

Twenty-second Day of May, 2001

Attest:

NICHOLAS P. GODICI

*Attesting Officer*  Acting Director of the United States Patent and Trademark Office